July 29, 1924. 1,502,692
W. R. STERRETT
LEER CONVEYER
Filed May 2, 1921 3 Sheets-Sheet 1

INVENTOR.
Walter R. Sterrett
by Bakewell Byrnes & Parmelee
his Attorneys

July 29, 1924.

W. R. STERRETT

LEER CONVEYER

Filed May 2, 1921

INVENTOR.
Walter R. Sterrett
by Bakewell Byrnes Parmelee
his Attorneys

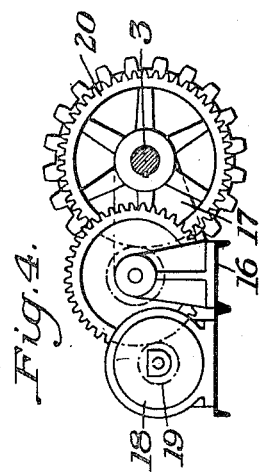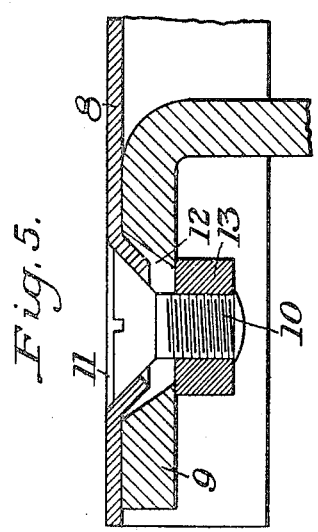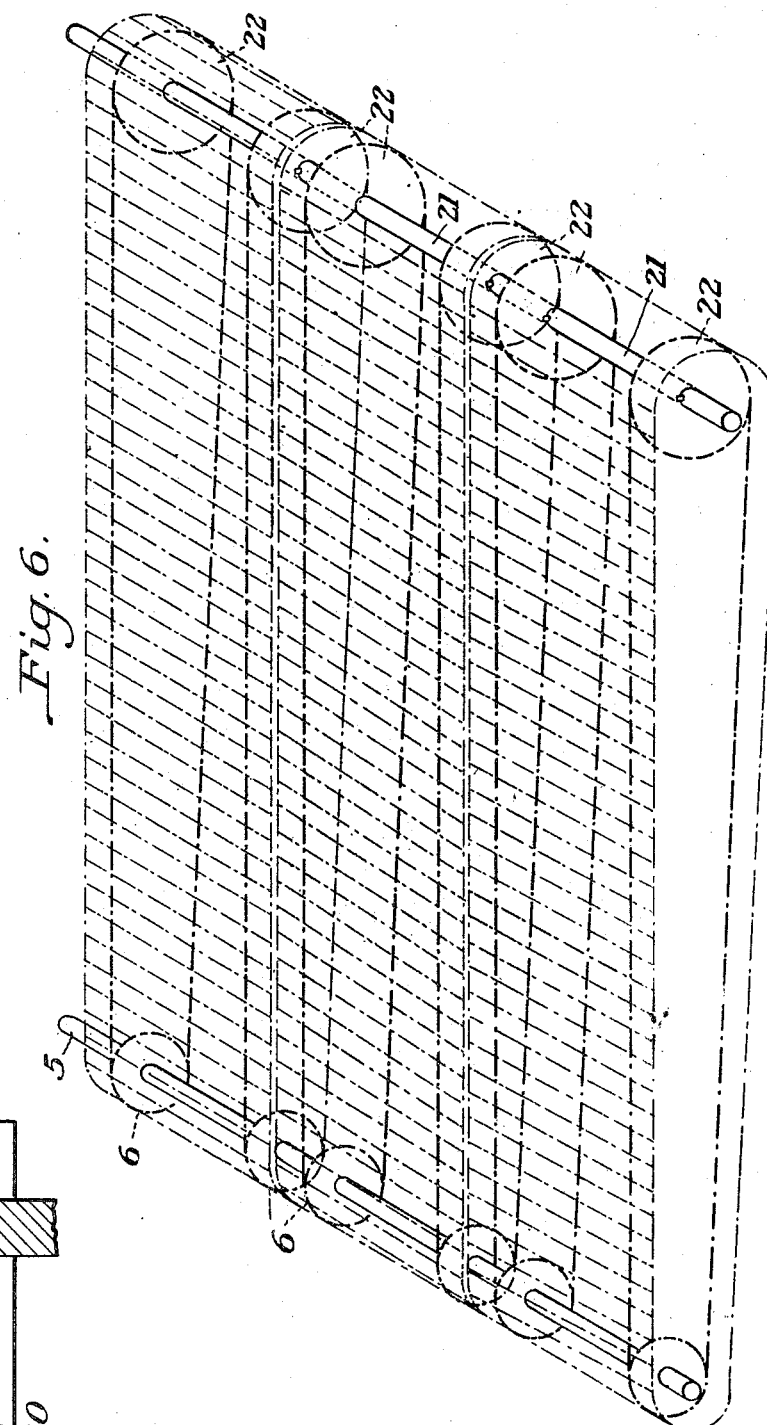

Patented July 29, 1924.

1,502,692

UNITED STATES PATENT OFFICE.

WALTER R. STERRETT, OF CARNEGIE, PENNSYLVANIA, ASSIGNOR TO H. L. DIXON COMPANY, OF PITTSBURGH, PENNSYLVANIA, A CORPORATION OF PENNSYLVANIA.

LEER CONVEYER.

Application filed May 2, 1921. Serial No. 466,192.

*To all whom it may concern:*

Be it known that I, WALTER R. STERRETT, a citizen of the United States, residing at Carnegie, in the county of Allegheny and State of Pennsylvania, have invented a new and useful Improvement in Leer Conveyers, of which the following is a full, clear, and exact description.

The present invention relates broadly to conveyers, and more particularly to conveyers, for leers, such as glass annealing leers, and is especially adapted for use in extra wide leers of this type.

An important object of the present invention is to provide a leer with a plurality of independent conveyers capable of relative movement.

Another object of the present invention is to provide a leer with a plurality of independently driven conveyers capable of being driven at the same or different speeds.

Still another object of the invention is to obviate the tendency of the conveyer pans to sag or become distorted and thereby break the conveyer chains.

The foregoing and other objects of the present invention, together with their attendant advantages, will be apparent as the invention becomes better understood by reference to the accompanying specification and drawings forming a part thereof, it being premised that changes may be made in the various details and manner of operation within the scope of the appended claims without departing from the spirit of the invention.

Figure 4 is a detail view illustrating one method of mounting the drive units for the conveyers;

Figure 5 is a detail sectional view illustrating one of the pan fastenings; and

Figure 6 is a diagrammatic view illustrating a modified form of the present invention.

Figure 1:
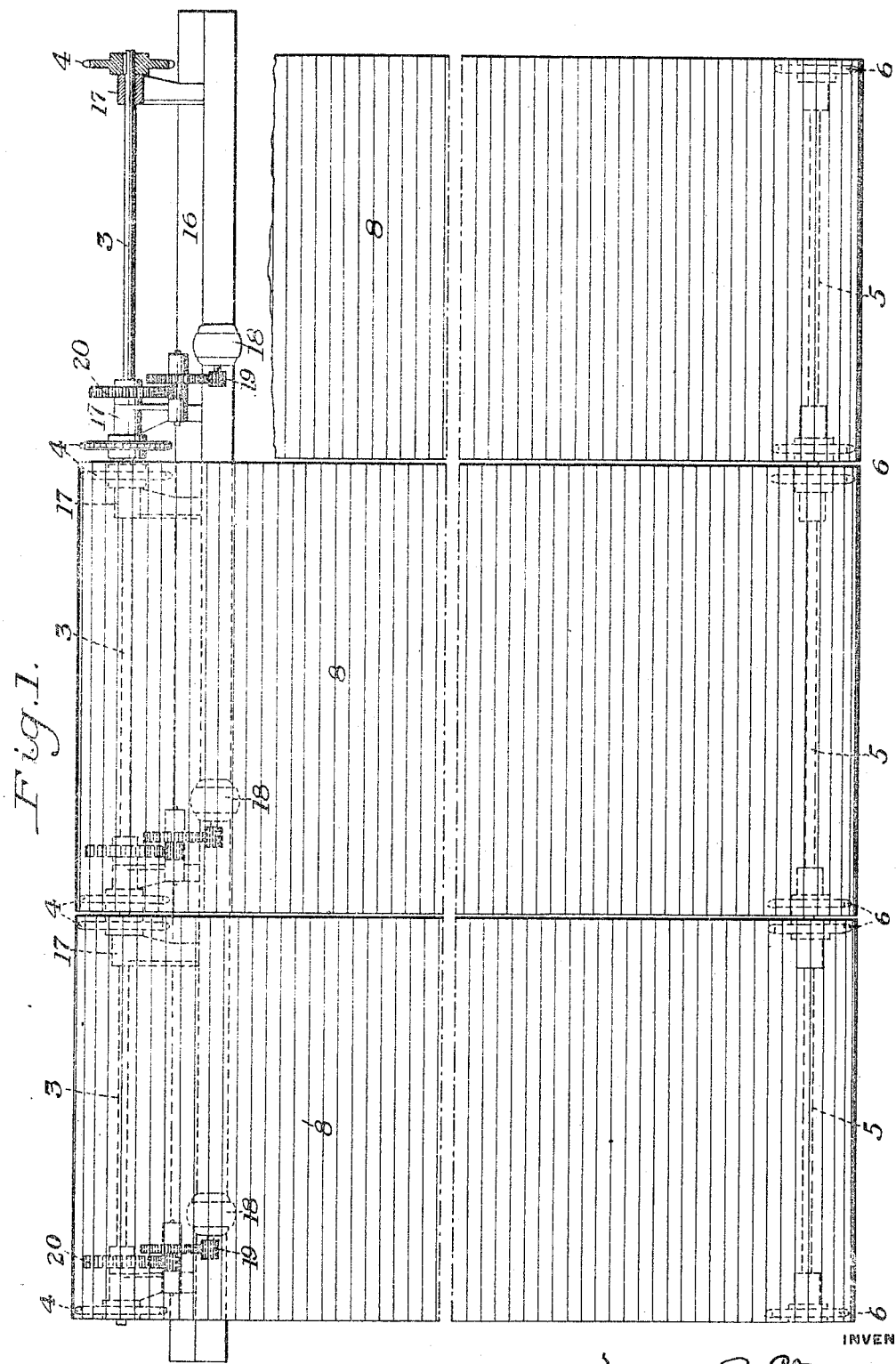
Figure 1 is a plan view, partly broken away, of a system of leer conveyers constructed in accordance with the present invention.
Figure 2:
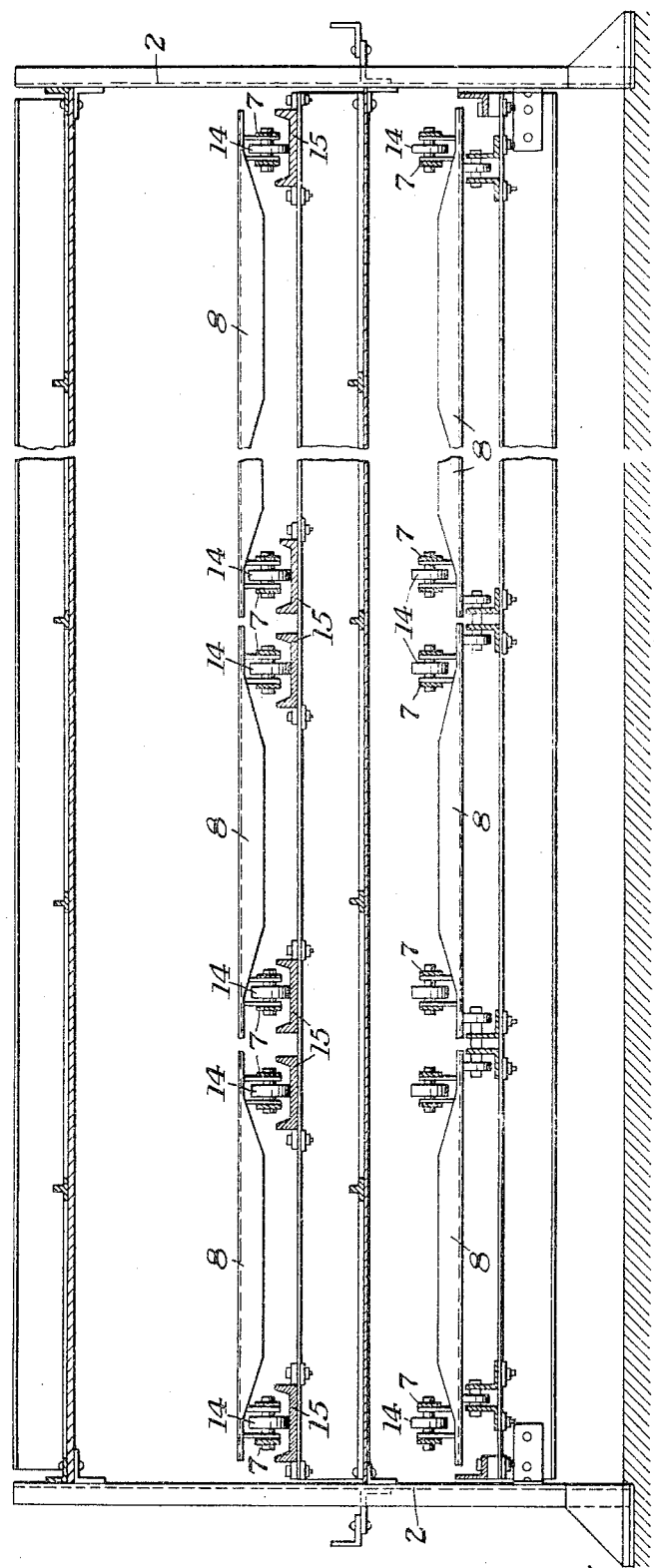
Figure 2 is a transverse section of a leer embodying the present invention.
Figure 3:
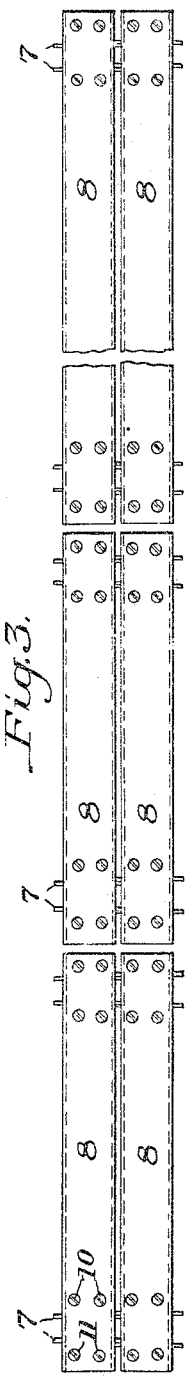
Figure 3 is a plan view illustrating a portion of the conveyer system.

In leers which are extra wide, there is a tendency for the conveyer pans, which have heretofore been constructed to extend substantially the entire width of the leer, to sag and become distorted, thereby throwing unequal strains on the chains supporting the pans, and tending to break the same. This condition is of course increased as the length of the pans increases, and may be directly attributed to a series of different causes. Among these, the most serious is perhaps the difference in the length of the chains which support the pans, thereby tending to throw the pans into angular position. By means of the present invention, these objectionable tendencies are entirely overcome, as the conveyers are constructed of a series of independent conveyer pans.

The present invention embodies certain of the features illustrated in my co-pending application Serial No. 453,457, filed March 18, 1921, and constitutes, for certain purposes, improvements over the invention disclosed therein.

Referring more particularly to the drawings, there is illustrated a frame of a leer 2, which may be of any desired construction, the present invention being applicable to various types of leers, but having nothing to do with the construction of the leer itself.

In the particular construction illustrated, there is provided adjacent the rear end of the leer a plurality of relatively independent, transversely extending shaft sections 3 having secured adjacent the opposite ends thereof drive sprockets 4. Adjacent the front of the leer is a continuous, transversely extending shaft 5 having a series of supporting sprockets 6 loosely mounted thereon. In this manner, there is provided a series of pairs of sprockets which are adapted to support independent chains 7 of any usual construction, each pair of chains having secured thereto a plurality of independent conveyer pans 8. The pans 8 may be secured to the horizontally directed flanges 9 of the chain links, by means adapted to permit the pans to adjust themselves both horizontally and vertically with respect to the chains. In the construction illustrated more particularly in Figure 5, each of these fastenings comprises a screw bolt 10 whose head is seated in a countersunk depression 11 of the pan. This countersunk portion 11 loosely fits within a conical opening 12 formed in the flange 9, and the bolts are secured by nuts 13. By this arrangement, relative movement between each of the chains and each of the pans is permitted, thereby compensating for changes in the lengths of the chains and relieving the pans from undue strain.

The wheels 14 carried by the chain links, may travel in suitable channel tracks 15, as is customary in this art.

For driving each of the shaft sections 3 independently of the others, there may be provided adjacent the end of the leer a transversely extending channel or similar member 16 having a plurality of bearing brackets 17 for the shaft sections. Intermediate each pair of bearing brackets may be mounted a variable speed motor 18, of any desired construction, having a pinion 19 which drives a gear 20 on each of the shaft sections, through any suitable arrangement of reduction gearing. Due to this construction, it will be apparent that the present conveyer system comprises a plurality of independent conveyers each having narrow pans, whereby the tendency to sag is obviated. In addition to this, the strain on each of the conveyer chains is reduced and the operation of the conveyers is thereby facilitated. Also, by reason of this construction, each of the conveyers may be driven at a different speed, if desired; and by placing different types of articles thereon, the period for which these articles are subjected to the heat of the leer may be varied as required. From a practical standpoint, this operation possesses several advantages, as it enables a single leer to be simultaneously used for the annealing of a plurality of different types of articles each requiring a different annealing period.

The loose supporting sprockets 6 on the shaft 5 compensate for the tendency of the conveyer chains to exert unequal strains on the pans, as these sprockets are capable of independent and relative rotation.

In the modified form of my invention illustrated in Figure 6, there is provided a continuous, transversely extending shaft 21, adjacent the rear of the leer, which is provided with a plurality of pairs of sprockets 22 suitably keyed thereto. A single motor, not shown, may drive the shaft through suitable gearing in the usual manner. In this construction the independent conveyers are not capable of operation at different speeds, but due to their construction in units, the tendency of the pans to sag or become distorted is greatly reduced, and objectionable strains are not transmitted to the conveyer chains. In extremely wide leers, this independent unit conveyer system has been found to possess certain advantages over the sectional pan construction illustrated in my co-pending application referred to.

The advantages of the present invention arise from the provision of a plurality of independent conveyer pans extending only partially across the leer and provided with independent supporting chains adjacent each end thereof.

Further advantages arise from the provision of the plurality of independent conveyers each capable of being driven independently or concomitantly with the others.

I claim:

1. In combination, a leer, a plurality of separate conveyers extending through the leer from end to end and arranged in parallel relation, and means for driving the different conveyers at different speeds, substantially as described.

2. In combination, a leer, a plurality of separate conveyers extending through the leer from end to end and arranged in parallel relation, and independent driving means for each of the conveyers whereby each conveyer may be driven at any desired speed, substantially as described.

3. In combination, a leer, a plurality of conveyers extending through the leer from end to end and arranged in parallel relation, each conveyer comprising a plurality of chains having carrying pans flexibly secured thereto to permit relative movement between the pans and the chains, substantially as described.

In testimony whereof, I have hereunto set my hand.

WALTER R. STERRETT.